United States Patent [19]
Hirschman et al.

[11] Patent Number: 5,543,864
[45] Date of Patent: Aug. 6, 1996

[54] METHOD AND KIT FOR ATTACHING SIDE SHIELDS TO EYEGLASS TEMPLES

[75] Inventors: Richard Hirschman, Albertson, N.Y.; Chul W. Shin, Masan, Rep. of Korea

[73] Assignee: Hudson Optical Corporation, Bohemia, N.Y.

[21] Appl. No.: 513,603

[22] Filed: Aug. 10, 1995

Related U.S. Application Data

[63] Continuation of Ser. No. 320,447, Oct. 11, 1994.

[51] Int. Cl.⁶ .................................................... G02C 9/00
[52] U.S. Cl. .............................. 351/47; 351/44; 351/121; 2/449; 2/451
[58] Field of Search .................................. 351/121, 122, 351/111, 158, 41, 47, 57; 24/3.3; 2/449, 448, 451, 12, 13

[56] References Cited

U.S. PATENT DOCUMENTS

| | | |
|---|---|---|
| 2,224,784 | 1/1932 | Goldschmid et al. . |
| 2,281,129 | 4/1942 | Wofll ............................................ 2/13 |
| 2,840,821 | 7/1958 | Gay, Jr., et al. . |
| 3,165,754 | 1/1965 | Rodgers, Jr., et al. . |
| 3,204,252 | 9/1965 | Herrington, Sr. . |
| 3,384,903 | 5/1968 | Malcom, Jr. . |
| 3,436,761 | 4/1969 | Liautaud et al. . |
| 3,505,679 | 4/1970 | Bennet . |
| 3,596,290 | 8/1971 | Kennedy . |
| 3,721,490 | 3/1973 | Prince . |
| 3,932,031 | 1/1976 | Johnston . |
| 4,298,991 | 11/1981 | Recenello . |
| 4,526,448 | 7/1985 | Hanson . |
| 4,751,746 | 6/1988 | Rustin . |
| 4,965,887 | 10/1990 | Paoluccio et al. . |

*Primary Examiner*—William L. Sikes
*Assistant Examiner*—Hung Xuan Dang
*Attorney, Agent, or Firm*—Ostrolenk, Faber, Gerb & Soffen, LLP

[57] ABSTRACT

A method for mounting safety shields onto eyeglass temples and a kit for carrying out that method. A temple of an eyeglass frame is placed in a channel forming part of a side shield thereafter, a pin is inserted into an opening formed in the side shield to create a force fit between the temple, the channel and the pin which attaches the side shield to the temple. The side shield is placed in its operative position before the pin is inserted into the opening and the force fit resulting from the insertion of the pin into the opening holds the side shield in its operative position. The kit includes a side shield having a longitudinally extending channel into which a longitudinally extending eyeglass temple may be inserted. The channel has an open lateral end through which the temple may be inserted and a supporting lateral end against which the temple may be supported. The side shield further includes an opening extending transversely to both the longitudinal direction and the supporting lateral wall. A pin is adapted to be inserted into the opening so as to force the temple against the supporting end of the channel to create a force fit between the side shield and the temple when the temple is located in the channel. A member having a slot formed therein is affixed to the temple to receive the pin and prevent the temple from moving longitudinally within the channel of the side shield.

19 Claims, 4 Drawing Sheets

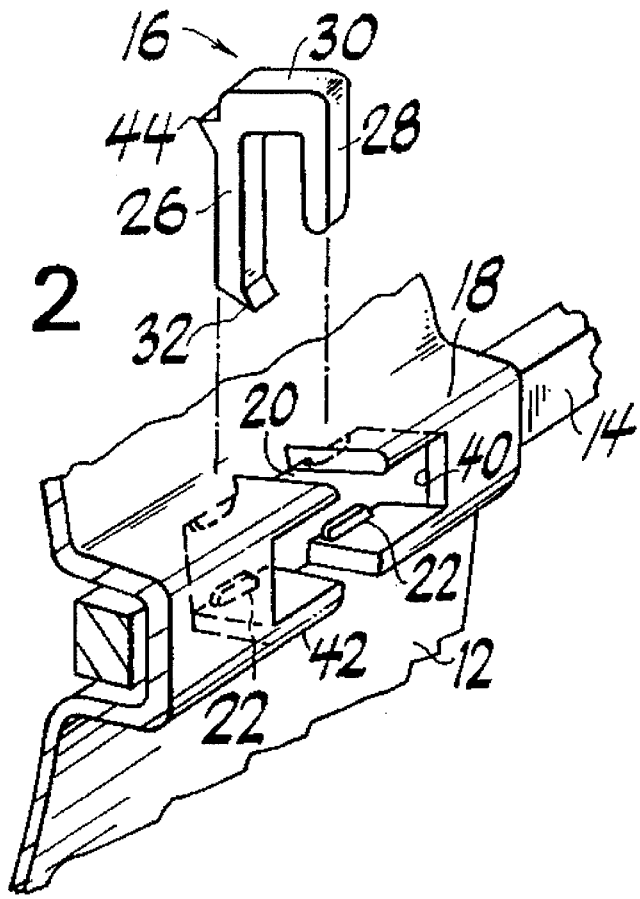
FIG. 2
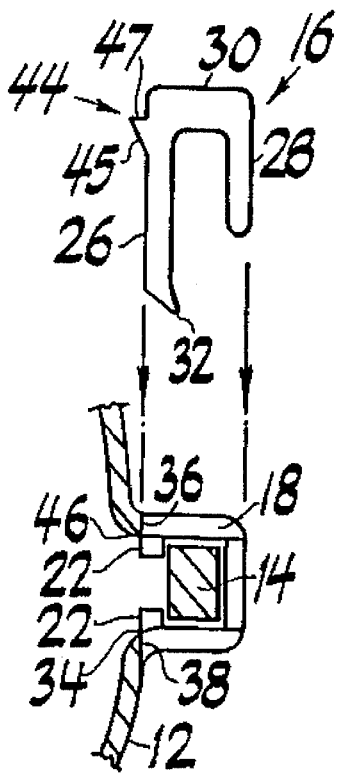
FIG. 4
FIG. 3

METHOD AND KIT FOR ATTACHING SIDE SHIELDS TO EYEGLASS TEMPLES

CROSS-REFERENCE TO RELATED APPLICATIONS

This is a continuing application of U.S. Ser. No. 08/320,447, filed Oct. 11, 1994.

BACKGROUND OF THE INVENTION

1. Field of the Invention

The present invention relates to an improved method for mounting safety shields onto eyeglass temples and a kit for carrying out that method.

2. Description of the Related Art

Conventional safety spectacles include side safety shields which are removably affixed. However, the case often arises where the employers do not want the employees removing the safety shields.

In the situations where the employer prefers that the shields be permanently affixed the methods of attachment have been rivets, screws, lock-nuts or adhesives. Drilling the temples, which may be plastic or metal, and then securing the shield with a screw or rivet has various drawbacks. Cutting a hole through the temple weakens the temples and often the temples break during drilling.

Moreover, drilling the temples cannot be done on an "as needed" basis in the field, but must be done in an optical laboratory or where a drill press is readily available.

Affixing the shields by rivets or screws prevents manufacturers from designing safety spectacles having thinner and lighter temples. Employees are more likely to comply with eye protection requirements where the safety spectacles are more comfortable and fashionable.

The extra drilling operations increase labor costs and opportunity for injury to the optical laboratory worker.

Another disadvantage with drilling or riveting the shields to the temples is that removal is awkward, requiring extra tools. The temples are weakened or broken during removal of the shields. At the least, the temple is left with an unsightly unaesthetic hole.

U.S. Pat. No. 3,505,679 discloses a pair of safety spectacles having removable side shields. Flanges of the side shield are snapped over the temple of the glasses. This is disadvantageous, as repeated placement and removal of the shields weakens the shield's flanges, and eventually the flanges will snap and the entire side shield must be replaced. Moreover, an employee can easily remove the shields, even if the employer requires the shields to be worn.

U.S. Pat. No. 3,721,490 discloses side shields which are permanently fastened to a pair of eyeglasses without the use of screws or adhesives. However, the attachment means are formed integrally with the side shields. Thus, not only is removal difficult, but once the shields are removed, they are not designed to be used again.

U.S. Pat. No. 3,165,754 teaches separate means for removably attaching the shields to temples of a pair of glasses. The attachment means comprise a support member having hooks for engaging a lens frame and a pair of sidewardly extending support arms which contact the top and bottom surfaces of the hinge between the temples and lens frame. The attachment means must be connected to the eyeglass frame and temples by a screw. Thus, simple installation is not possible.

SUMMARY OF THE INVENTION

The present invention makes it possible to secure side shields to the temples of a pair of glasses in such a manner that the shields cannot easily be removed. In the preferred embodiment, the side shields are attached to the temples by a pin which "permanently" secures the side shields to the temple in the sense that the pin must be permanently deformed or broken (e.g., by cutting) in order to remove the side shields.

In accordance with the method of the present invention, a side shield is attached to the temple of an eyeglass frame by:

(a) placing the temple in a channel forming part of this side shield; and thereafter (b) inserting a pin into both an opening formed in the side shield and into a slot formed in a member affixed to the temple to create a force fit between the temple, the channel and the pin which attaches the side shield to the temple.

In the preferred embodiment, the side shield is initially placed in its operative position before the pin is inserted into the opening and the force fit resulting from the insertion of the pin into the opening holds the side shield in the operative position.

The kit of the present invention comprises:

(a) a side shield having a longitudinally extending channel into which a longitudinally extending eyeglass temple may be inserted, said channel having an open lateral end through which said temple may be inserted and a supporting lateral wall against which said temple may be supported, said side shield further having an opening extending traverse to both said longitudinally extending channel and said supporting lateral wall;

(b) a pin adapted to be inserted into said opening so as to force said temple against said supporting lateral wall of said channel and to create a force fit between said side shield and said temple when said temple is located in said channel; and (c) a member having a slot formed therein affixed to said temple to receive said pin and prevent said temple from freely moving longitudinally within the channel of said side shield.

BRIEF DESCRIPTION OF THE DRAWINGS

For the purpose of illustrating the invention, there is shown in the drawing several forms which are presently preferred, it being understood, however, that the invention is not limited to the precise arrangements and instrumentalities shown.

FIG. 2 is a detailed perspective view partially in section showing the manner in which the kit of the present invention can be mounted on eyeglass temples.

FIG. 3 is a sectional view taken along lines 3—3 of FIG. 2 before the pin of FIG. 1 has been used to attach the side shields of FIG. 1 to the temples of the eyeglass frame of FIG. 1.

FIG. 4 is a cross sectional view taken along lines 3—3 of FIG. 1, wherein the pin has been inverted into its operative position.

DETAILED DESCRIPTION OF THE PREFERRED EMBODIMENTS

Figure 1:
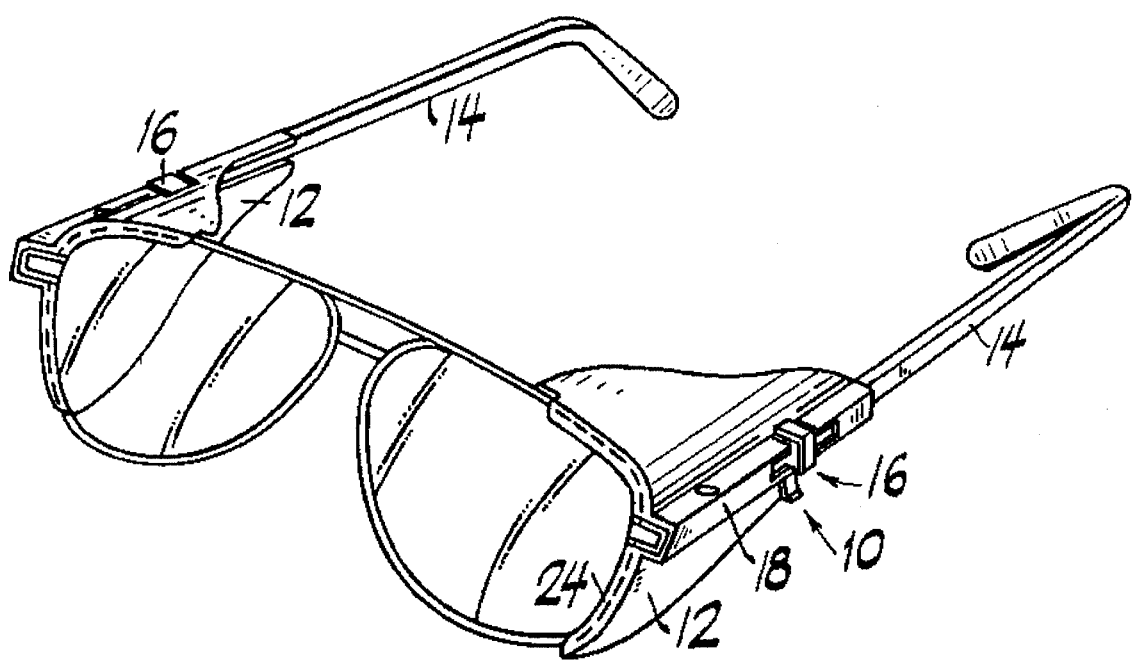
FIG. 1 is a perspective view of a pair of glasses having safety shields mounted thereto using the kit of the present invention.

Referring now to the drawings, wherein like numerals indicate like elements, there is shown in FIG. 1, a pair of eyeglasses 10 which have been made into safety glasses by the additional of side shields 12 coupled to the temples 14 of the eyeglass frames 15 in accordance with the preferred embodiment of the present invention.

The kit of the present invention makes it possible to add side shields to a standard eyeglass frame 15 on the job site. The kit includes a pair of side shields 12 and a pair of connecting pins 16 for coupling the side shields 12 to the temples 14. In the preferred embodiment, the side shields 12 wrap around the side and a portion of the top of the glasses 10.

A longitudinally extending channel 18 is formed in each side shield 12 as best shown in FIGS. 1–3. The channels 18 extend along a longitudinal axis and are adapted to closely receive a respective temple 14 of the eyeglass frame 15. Before the pin 16 is inserted into an opening 20 formed in the channel 18, the temple 14 sits loosely, but closely fitted, within the channel. See FIGS. 2 and 3. In the preferred embodiment, the channel 18 is formed integrally with the side shield 12. If desired, however, the channel 18 may be formed separately and connected to the side shield 12 by any appropriate means.

Four detents 22 are formed in the open lateral end of channel 18 to temporarily hold the temple 14 within the channel 18 before the side shield 12 is "permanently" attached to the temple 14 by insertion of the pin 16 into the opening 20. Since the space between detents 22 is smaller than the height of the temple 14 (as best shown in FIG. 3), the temple is preferably inserted into the channel 18 in a position perpendicular to that illustrated in FIG. 3 and is then rotated into the position illustrated. Before the side shield 12 is "permanently" attached to the temple 14, it is placed in its operative position illustrated in FIG. 1. In this position, the front of eye shield 12 should be aligned with the front of the frame 15. Since the temple 14 fits loosely within the channel 18, the side shield 12 can easily be moved longitudinally along the temple 14 into the operative position. In the preferred embodiment, a lip 24 (FIG. 1) is formed on the front edge of the side shields 12 to partially cover the front of the eyeglass frame 15. Once the side shield 12 has been moved into the operative position, it is "permanently" affixed to the temple 14 by inserting pin 16 into the opening 20.

As best shown in FIG. 3, the pin 16 is preferably U-shaped and includes a pair of legs 26, 28 which depend from a common cross bar 30. In the preferred embodiment, the left or insertion leg 26 is longer than the right leg 28. The primary purpose of the right leg 28 is to partially close the opening 20 formed in the channel 18 once the pin 16 has been inserted into opening 20. The insertion leg 26 operates as a wedge between the temple 14 and the side shield 12 and frictionally couples these elements together. Particularly, as the insertion leg 26 is moved into the opening 20 between the temple 14 and the side edges 36, 38 (see FIG. 3) of the side shield 12, the insertion leg 26 will force the temple 14 to the right, wedging it against the surfaces 40, 42 (see FIG. 2) of the channel 18. This captures the temple 14 within the channel 18 and makes it difficult to slide the channel 18 relative to the temple 14.

To assist in the insertion process, the distal end 32 of insertion leg 26 is formed with a bevel which prevents the end 32 from getting caught on the edge 34 (FIG. 3) of the side shield 12. In the preferred embodiment, the end 32 is formed with an angular bevel. A curved bevel could also be used.

In the preferred embodiment, the materials (preferably deformable plastic) of the side shield 12 and pin 16 as well as the size and shape of the channel 18 and insertion leg 26 are selected to ensure that the insertion leg 26 must be force fit into the opening 20 and will maintain a substantial force fit between the temple 14, the leg 26 and the supporting surfaces 40, 42 (FIG. 2) to make it difficult to remove the pin 16 from the opening 20 and also to make it difficult to slide the side shield 12 longitudinally along the temple 14. This will create an essentially "permanent" connection between the side shields 12 and the temples 14. Of course, the connection is not really permanent since the pin 16 can be removed from the opening, at least with the aid of a tool such as pliers, and since the pin can always be cut.

To improve the "permanent" nature of the coupling, the pin 16 is preferably performed with an angularly detent 44 which allows the pin 16 is be snap-fit to the opening 20 as the insertion leg 26 is inserted between the temple 14 and the surfaces 36, 38 of side shield 12. The beveled edge 45 of detent 44 permits the insertion leg 26 to be inserted fairly easily into the opening 20. Once the detent 45 has moved beyond the edge 46 of the side shield 12 (see FIG. 4). The top edge 47 of the bevel 44 snaps below the edge 46 and makes it difficult to remove the pin 16 from the opening 18.

While the pin of the preferred embodiment has a pair of legs 26, 28, it is the interaction between insertion leg 26, temple 14 and surfaces 36–42 which create the desired force fit connection. Accordingly, the leg 28 and cross bar 30 can be omitted if desired.

Figure 5:
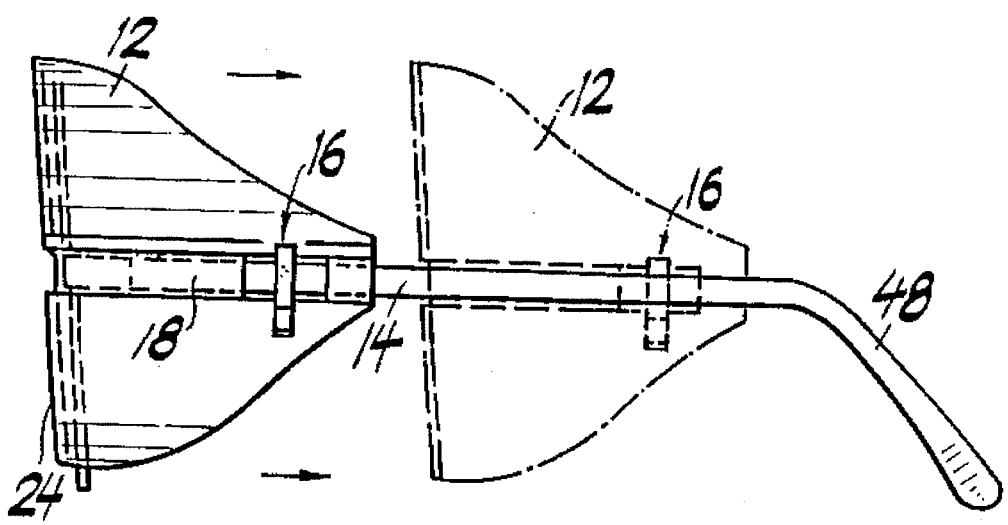
FIG. 5 is a side view of a pair of glasses onto which the safety shield has been mounted.

While the foregoing embodiment is satisfactory in most circumstances, it is possible for the wearer of the glasses to defeat the "permanent" nature of the connection by sliding the side shields 12 axially towards the rear of temple 14 as shown in FIG. 5. While the force fit created by the insertion of the pin into the opening will make it difficult to slide the side shields longitudinally along the temples 14, it is possible to do so with the use of significant force.

In most eyeglass frames, the height of the temples reduces towards the ear piece 48. As a result, when the side shield is moved into the position shown in phantom in FIG. 5, the force fit connection between the pin 16, the temple 14 and the side shield 12 is significantly reduced making it possible to rotate the side shield 12 relative to the temple 14 and to remove the pin 16.

In order to reduce this possibility, it is often desirable to provide additional means for preventing longitudinal movement of the side shields 12 along the temples 14. Three structures for achieving this result are illustrated in FIGS. 6 through 11.

Figure 6:
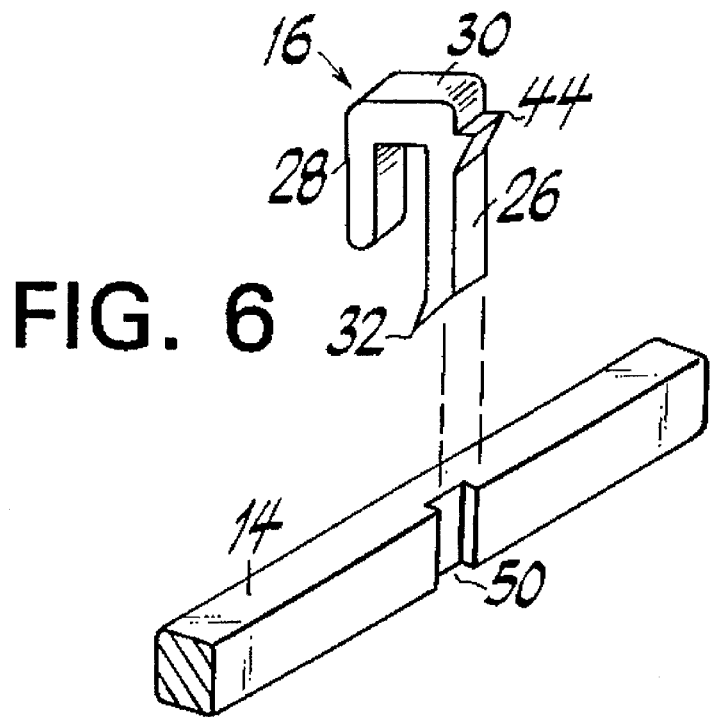
FIGS. 6 and 7 are detailed views showing a first modification of the present invention which prevents the side shield from being moved longitudinally along the eyeglass temple.
Figure 7:
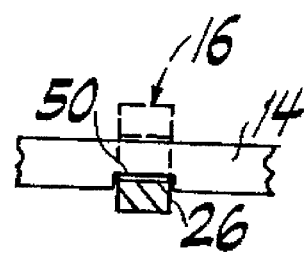

In the embodiment of FIGS. 6 and 7, a thin notch 50 is milled into the temples 14 to receive the insertion leg 26 of connecting pin 16. As the insertion leg 26 is moved into the hole 20 (the side shield 12 and its associated channel 18 are not shown in these figures), it is inserted into the notch 50 and finally rests within the notch 50 as shown in FIG. 7. As a result, the temple 14 is not free to move longitudinally within the channel 18. While a small groove is formed in the temple 14, this does not have the drawbacks of the prior art systems wherein a hole is drilled into the temple 14. Since only a small notch need be formed, the temple 14 is only slightly weakened. More importantly, there will be no unsightly hole in the temple if the side shields are removed since the notch 50 is formed in the side of the temple adjacent the wearer's head and is not seen when the glasses are worn.

Figure 8:
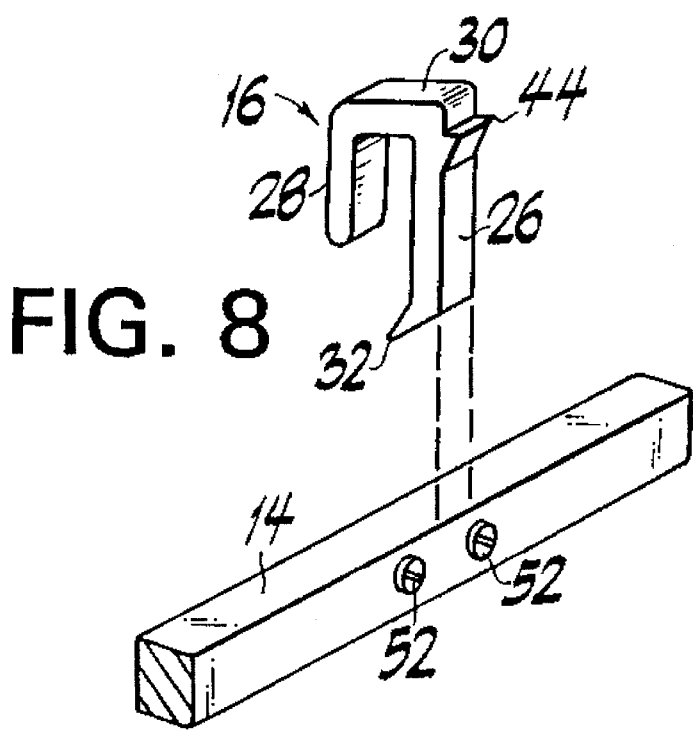
FIGS. 8 and 9 are further detailed views showing a second modification of the present invention which prevents the side shield from being moved longitudinally along the eyeglass temple.
Figure 9:
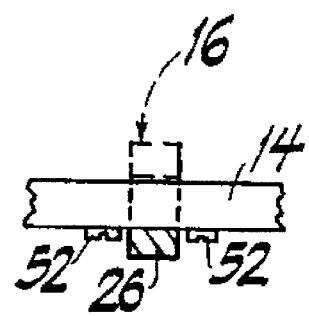

In the embodiment of FIGS. 8 and 9 (again the side shield 12 and its associated channel 18 are not illustrated), the insertion leg 26 is inserted between a pair of projections 52 which prevent longitudinal movement of the temple 14 relative to the side shield 12. The projections 52 are preferably the heads of screws which are utilized to screw the temple 14 to the frame of the eyeglasses 10.

Figure 10:
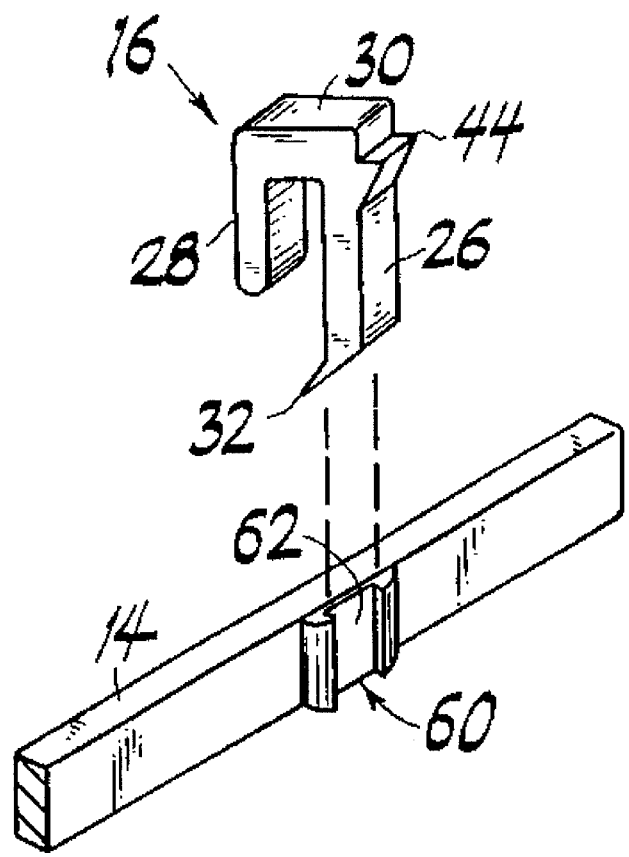
FIGS. 10 and 11 are further detailed views showing a third modification of the present invention which prevents the side shield from being moved longitudinally along the eyeglass temple.
Figure 11:
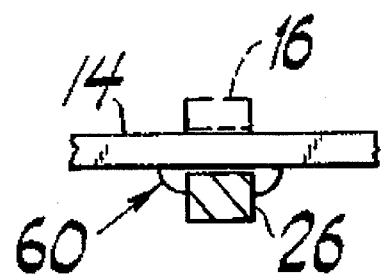

In the embodiment of FIGS. 10 and 11, a metal member 60 having a slot 62 formed therein is soldered or otherwise affixed to the temples 14 to receive the insertion leg 26 of a connecting pin 16. By providing for a separate member 60 with a slot 62 formed therein, it is not necessary to form any slots or holes in the temple 14 itself which would weaken the temple 14. Additionally, there will be no unsightly hole in the temple 14 if the side shields 12 are removed since the member 60 is located on the inside of the temple 14 adjacent the wearer's head and is not seen when the glasses are worn.

As the insertion leg 26 is moved into the hole 20 (the side shield 12 and its associated channel 18 are not shown in these figures), it is also inserted into the slot 62 of the member 60 and finally rests within the slot 62 as shown in FIG. 11. As a result, the temple 14 is not free to move longitudinally within the channel 18.

The present invention may be embodied in other specific forms without departing from the spirit or essential attributes thereof and, accordingly, reference should be made to the appended claims, rather than to the foregoing specification, as indicating the scope of the invention.

What is claimed is:

1. A method of attaching a side shield to a temple of an eyeglass frame of the type which has a member with a slot formed therein coupled to said temple, said method comprising the steps of:
   (a) placing said temple in a channel forming part of said side shield; and thereafter
   (b) inserting a pin into both an opening formed in said side shield and said slot to create a force fit between said temple, said channel and said pin which attaches said side shield to said temple.

2. The method of claim 1, wherein said temple extends along a longitudinal direction, said slot extending in a direction perpendicular to said longitudinal direction, said pin preventing said side shield from moving in said longitudinal direction.

3. The method of claim 2, wherein said member is formed of synthetic material and said member is coupled to said temple.

4. The method of claim 2, wherein said member is formed of metal and is soldered to said temple.

5. A kit for attaching a safety shield to a temple of a pair of eyeglasses, said kit comprising:
   (a) a side shield having a longitudinally extending channel into which a longitudinally extending eyeglass temple may be inserted, said channel having an open lateral end through which said temple may be inserted and a supporting lateral wall against which said temple may be supported, said side shield further having an opening extending transverse to both said longitudinally extending channel and said supporting lateral wall;
   (b) a member having a slot formed therein coupled to said temple; and
   (c) a pin adapted to be inserted into both said opening and said slot so as to force said temple against said supporting wall of said channel and to create a force fit between said side shield and said temple when said temple is located in said channel.

6. The kit of claim 5, wherein said member is formed of synthetic material and said member is coupled to said temple.

7. The kit of claim 5, wherein said member is formed of metal and said member is soldered to said temple.

8. The kit of claim 5, wherein said member is rounded on respective sides.

9. The kit of claim 5, wherein said pin and said channel are formed of a deformable plastic material.

10. The kit of claim 5, wherein said pin has an insertion section adapted to be inserted into both said opening and said slot, an end of said insertion section being beveled to assist in the insertion of the insertion section into said opening and said slot.

11. The kit of claim 10, wherein the insertion section further has a detent formed thereon to create a snap fit between said insertion section and said side shield as said insertion section is inserted into said opening when said temple is located in said channel.

12. The kit of claim 5, wherein said pin is formed with a detent which enables said pin to be snap fit onto said side shields.

13. The kit of claim 5, wherein said pin is U-shaped.

14. The kit of claim 13, wherein said U-shaped pin has first and second legs adapted to straddle said temple.

15. The kit of claim 14, wherein a first one of said legs is beveled to assist the insertion of that leg into said opening and said slot.

16. The kit of claim 15, wherein a detent is formed on one of said legs.

17. The kit of claim 16, wherein said detent is formed on said first one of said legs.

18. The kit of claim 17, wherein said pin includes a pair of legs depending from a cross bar and wherein a detent is formed in one of said legs at a location adjacent said cross bar.

19. The kit of claim 5, wherein said slot is of a width approximately equal to the width of an insertion section of said pin.

* * * * *